Nov. 30, 1971   M. R. PIKE   3,623,328

GAS TURBINE POWER PLANT

Filed Sept. 8, 1970   2 Sheets-Sheet 1

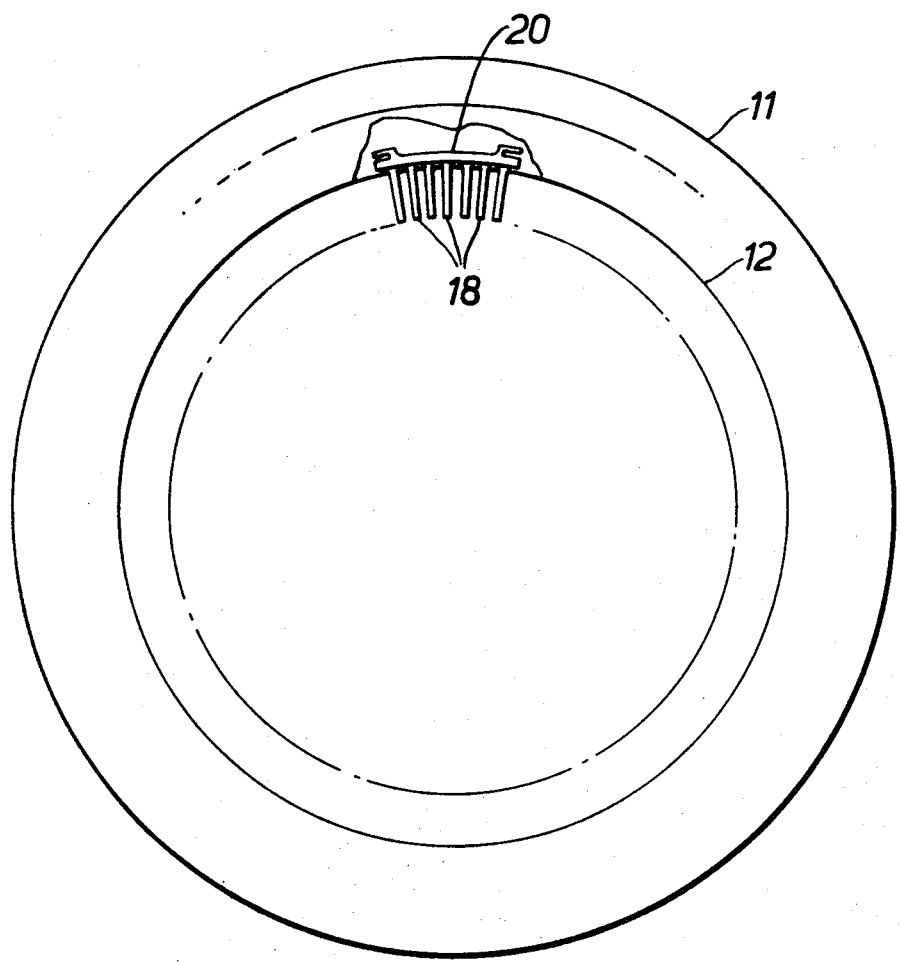

United States Patent Office 3,623,328
Patented Nov. 30, 1971

3,623,328
GAS TURBINE POWER PLANT
Malcolm Roy Pike, Nottingham, England, assignor to Rolls-Royce Limited, Derby, England
Filed Sept. 8, 1970, Ser. No. 70,103
Claims priority, application Great Britain, Sept. 26, 1969, 47,563/69
Int. Cl. F02k 11/00
U.S. Cl. 60—226
6 Claims

ABSTRACT OF THE DISCLOSURE

The invention concerns a gas turbine power plant including an outer casing, an air intake adjacent the upstream end of said outer casing, and a ring of angularly spaced apart members mounted for movement between an inoperative position in which the said members are retracted into said outer casing so as not to interfere with the flow of air through the said intake, and an operative position in which the said members extend into the said intake partially to obturate the latter, but so as to permit air to flow between pairs of adjacent members, the extent of obturation by the said members ensuring that the velocity of the air flowing therebetween is increased relative to the increased velocity of the air flowing through the unobturated portion of the intake, but that it remains at a mean value below Mach 1, and powered means for effecting the said movement.

---

Figure 1:
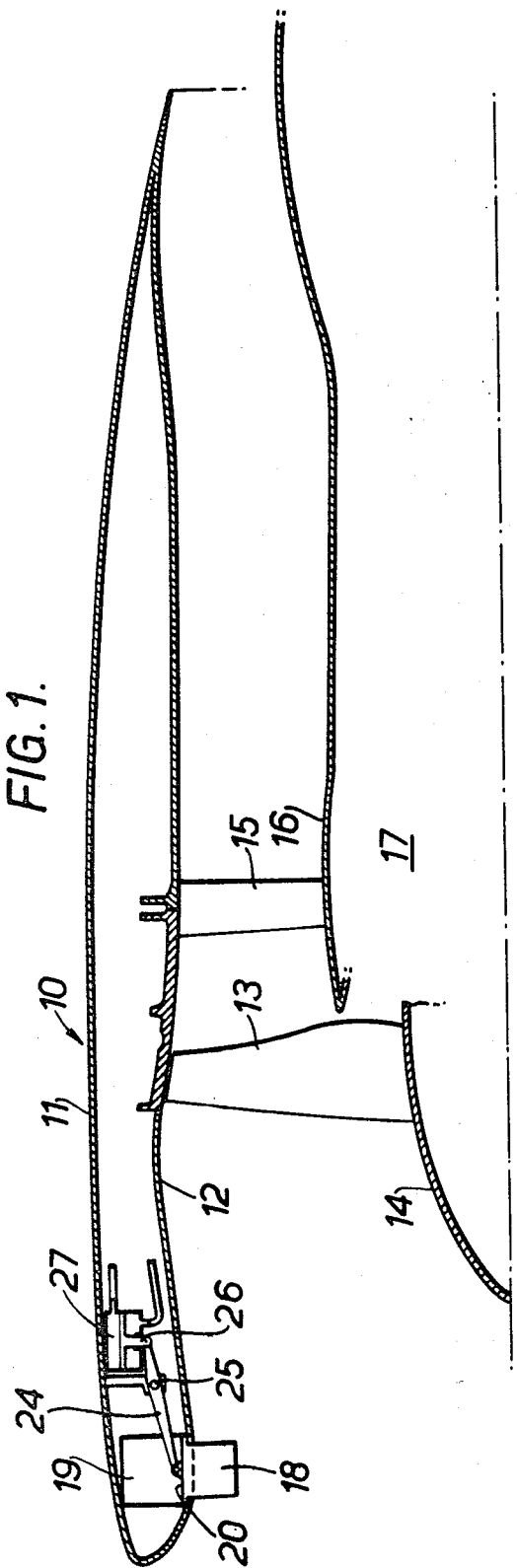

This invention concerns a gas turbine power plant, and although it is not so restricted, it relates particularly to a gas turbine power plant for aircraft in which the operational noise level of the power plant is reduced, particularly at take-off and landing of the aircraft.

It is known that one source of noise emanating from aircraft gas turbine engines is due to the phenomenon known as "wake interaction" which is caused by wakes created by rotating blades of the engine interacting with stationary blades or vanes and also with the wakes created by the blades of successive or adjacent rotor stages. The noise created by wake interaction is of sonic frequency and often finds its way out of the engine through the front or upstream end thereof.

Although the present invention is in no way so restricted, in one important aspect thereof it provides a gas turbine power plant including an outer casing, an air intake at or adjacent the upstream end of said outer casing, and a ring of angularly spaced apart members mounted for movement between an inoperative position in which the said members are retracted into said outer casing so as not to interfere with the flow of air through the said intake, and an operative position in which the said members extend into the said intake partially to obturate the latter, but so as to permit air to flow between pairs of adjacent members, the extent of obturation by the said members being arranged to be such that the velocity of the air flowing therebetween is increased relative to the increased velocity of the air flowing through the unobturated portion of the intake, but remains at a mean value below Mach 1, and powered means for effecting the said movement.

It will therefore be appreciated that sonic frequency noise due to wake interaction between rotating and stationary parts of the engine coming out through the front of that engine is substantially reduced by refraction of the sonic waves through the graded velocity field at the intake entry and by relaxation of sonic vibrations in the transit period through the intake, which effect is increased by the higher speed of the ingested air proceeding against the sound wave propagation.

Preferably the said members are constituted by substantially aerofoil shaped vanes.

Each member or vane may be formed with anti-icing fluid ducts.

The powered means preferably includes a double-acting piston-and-cylinder unit the piston of which is connected to one end of a rocking lever, the other end of said rocking lever being connected to said ring.

The power plant is preferably a front fan gas turbine engine, the said outer casing being the fan casing.

In a preferred embodiment, the said ring is located sufficiently upstream of the upstream-most rotor stage or fan of the power plant for any wakes caused in the ingested air stream by the said members in their operative position to be substantially smoothed out before the said stream reaches the said rotor stage or fan.

Figure 2:
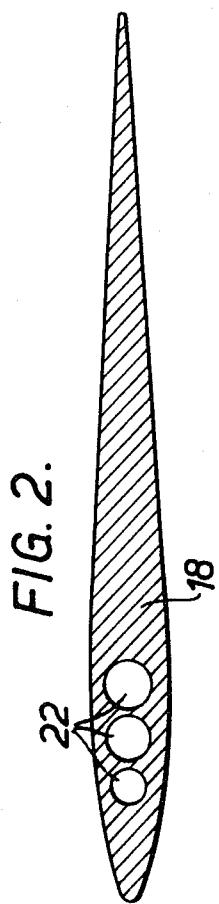

The invention will now be described, merely by way of example, with reference to the accompanying drawings, in which:

FIG. 1 is a diagrammatic axial half section of a power plant in accordance with the present invention, FIG. 2 is a sectional view on an enlarged scale of a vane shown in FIG. 1, and FIG. 3 is a front view of the gas turbine power plant of FIG. 1, showing a few vanes in their operative positions.

Referring to the drawings, there is shown a gas turbine power plant 10 of front fan type, the power plant 10 having an annular fan casing comprising an outer wall 11 and an inner wall 12 which defines a fan duct, the space between the outer wall 11 and the inner wall 12 being substantially hollow. The fan casing partly surrounds a gas generator casing 16 within which is mounted a gas generator 17 in the form of a substantially conventional gas turbine engine. Upstream of the gas generator 17 there is a fan rotor stage 13 mounted on a hub 14 so as to be coaxial with the gas generator 17 and to be rotatable therewith. The gas generator casing 16 is secured to the wall 12 of the fan casing by means of substantially radially extending aerofoil-shaped struts 15 located downstream of the fan rotor stage 13. The common rotational axis of the fan rotor stage 13 and the rotors of the gas generator 17 is denoted by the dotted line X—X.

The upstream end of the fan duct is provided with a ring of substantially aerofoil-shaped stub-like vanes 18 which are mounted so as to be retractable into a suitable recess 19 within the fan casing, so that in their retracted position they are completely radially beyond the wall 12. As can be seen from FIGS. 1 and 3, in their operative or extended positions, the vanes 18 only occupy a very small area of the intake defined by the inner wall 12, and as can be seen more particularly from FIG. 3, a plurality, e.g. seven, such vanes 18 are mounted on a common platform 20. Thus, there is provided a plurality of angularly spaced apart platforms 20 so that in the operative position of the vanes 18, there is a substantially complete annular ring thereof for obturating the radially outermost portion of the intake. As can be seen from FIG. 3, the vanes 18 are angularly spaced apart so that air ingested into the engine may flow therebetween.

As shown in FIG. 2, the vanes 18 are provided with a plurality of anti-icing ducts 22 through which in operation hot air may be blown for anti-icing purposes.

To effect movement of the vanes 18 with their platforms 20, the latter are pivotally connected to one end of a rocking lever 24 pivoted at 25, the other end of the rocking lever 24 being connected to a double-acting piston 26 slidably mounted in a cylinder 27. The cylinder 27 is provided with pressure fluid inlets and outlets, and the control pressure is supplied from a source within the power plant.

When an aircraft provided with a power plant 10 is about to land or take off, and it is desired to reduce the operational noise level to a minimum, the vanes 18 are moved from their inoperative to their operative positions in which they obturate the radially outer part of the intake. This reduction of the effective intake area causes the velocity of the air ingested generally to increase, but that portion of the air which flows between or immediately adjacent the vanes 18 is accelerated more than the remainder.

It has been found that noise due to wake interaction coming out of the front end of the engine is not distributed radially uniformly, and the major proportion of the noise is due to the tips of the blades of the engine. The present invention is particularly designed to reduce or eliminate that portion of the noise due to wake interaction which originates at the tip portions of the blades of the engine.

In the present invention, the vanes 18 are so designed that the velocity of the ingested air flowing through or immediately adjacent the region which the vanes can obturate reaches a near-sonic mean value, preferably of the order of 0.8 to 0.85 Mach. It will be appreciated that as a result of the air velocity in that region being of near-sonic mean value, the sonic waves coming out of the engine through that portion of the intake are very substantially attenuated by the air entering the power plant in the opposite direction and at a speed which locally matches or generally nearly matches that of the sonic waves.

Moreover, because the actual obturation caused by the vanes 18 in their operative positions is relatively small, the consequent loss in pressure of the air entering the fan 13 is small and will not be of a magnitude such as to require correction and therefore no special compensation for this obturation is required.

A further noise reduction feature of the present invention is that the fan rotor stage 13 is set well back axially from the vanes 18 and therefore any turbulence caused by the vanes 18 in their operative positions will have a chance of being smoothed out before reaching the fan rotor stage 13. Additionally, it is to be noted that the fan rotor stage 13 has no inlet guide vanes upstream thereof, whereby a source of wake interaction, and thus noise, is eliminated.

I claim:

1. A gas turbine power plant including an outer casing, an air intake adjacent the upstream end of said outer casing, and a ring of angularly spaced apart members mounted for movement between an inoperative position in which the said members are retracted into said outer casing so as not to interfere with the flow of air through the said intake, and an operative position in which the said members extend into the said intake partially to obturate the latter, but so as to permit air to flow between pairs of adjacent members, the extent of obturation by said members ensuring that the velocity of the air flowing therebetween is increased relative to the increased velocity of the air flowing through the unobturated portion of the intake, but that it remains at a mean value below Mach 1, and powered means for effecting the said movement.

2. A power plant as claimed in claim 1 wherein the said members are constituted by substantially aerofoil-shaped vanes.

3. A power plant as claimed in claim 1 wherein each member is formed with anti-icing fluid ducts.

4. A power plant as claimed in claim 1 wherein the said powered means includes a double-acting piston-and-cylinder unit the piston of which is connected to one end of a rocking lever, the other end of said rocking lever being connected to said ring.

5. A power plant as claimed in claim 1 wherein the power plant is a front fan gas turbine engine, the said outer casing being the fan casing.

6. A power plant as claimed in claim 1 wherein the said ring is located sufficiently upstream of the upstream-most rotor stage of the power plant for any wakes caused in the ingested air stream by the said members in their operative position to be substantially smoothed out before the said stream reaches the said rotor stage.

References Cited

UNITED STATES PATENTS

| 3,532,100 | 10/1970 | Ward | 137—15.1 |
| 3,532,129 | 10/1970 | Ward | 137—15.1 |
| 3,583,417 | 6/1971 | Clark | 137—15.1 |

DOUGLAS HART, Primary Examiner

U.S. Cl. X.R.

137—13.1